US012740584B2

(12) United States Patent
Juarros et al.

(10) Patent No.: US 12,740,584 B2
(45) Date of Patent: Sep. 22, 2026

(54) EXTRUDER DEVICE WITH AT LEAST TWO SCREWS AND A COMMON COMPARTMENT

(71) Applicant: Revo Foods GmbH, Vienna (AT)

(72) Inventors: Victor Juarros, Vienna (AT); Manuel Lachmayr, Vienna (AT); Robin Simsa, Vienna (AT); Timothé Renaudin, Vienna (AT)

(73) Assignee: Revo Foods GmbH, Vienna (AT)

( * ) Notice: Subject to any disclaimer, the term of this patent is extended or adjusted under 35 U.S.C. 154(b) by 64 days.

(21) Appl. No.: 18/817,648

(22) Filed: Aug. 28, 2024

(65) Prior Publication Data

US 2025/0176606 A1 Jun. 5, 2025

(30) Foreign Application Priority Data

Dec. 4, 2023 (EP) .................................... 23213992

(51) Int. Cl.
*A23P 30/20* (2016.01)
*B33Y 30/00* (2015.01)
*B65G 15/28* (2006.01)

(52) U.S. Cl.
CPC ............... *A23P 30/20* (2016.08); *B33Y 30/00* (2014.12); *B65G 15/28* (2013.01); *B65G 2201/0202* (2013.01)

(58) Field of Classification Search
CPC ......... A23P 30/20; B33Y 30/00; B65G 15/28; B29C 48/375; B29C 64/106
See application file for complete search history.

(56) References Cited

U.S. PATENT DOCUMENTS

| | | | | |
|---|---|---|---|---|
| 5,450,984 | A * | 9/1995 | Rohr | G01G 13/24 222/64 |
| 2024/0208154 | A1 * | 6/2024 | Marzorati | B33Y 40/20 |
| 2024/0315306 | A1 | 9/2024 | Larumbe Beramendi | |

FOREIGN PATENT DOCUMENTS

| | | | | |
|---|---|---|---|---|
| CN | 116584682 | * | 8/2023 | |
| CN | 116584682 | A | 8/2023 | |
| WO | WO-2020136383 | A1 * | 7/2020 | B33Y 30/00 |
| WO | 2022/076368 | A1 | 4/2022 | |
| WO | 2023/007050 | A1 | 2/2023 | |
| WO | 2023021148 | A1 | 2/2023 | |

* cited by examiner

*Primary Examiner* — Larry W Thrower
(74) *Attorney, Agent, or Firm* — Workman Nydegger

(57) ABSTRACT

An extruder device for 3D printing a viscous material, such as a plant-based foodstuff material, where the extruder device includes two compression screws, which are arranged within a common compartment, and the common compartment includes a nozzle for each compression screw, a feeding section (FS) for feeding the viscous material to the two compression screws and a compression section (CS) located between the feeding section and the nozzles for compressing the viscous material.

15 Claims, 5 Drawing Sheets

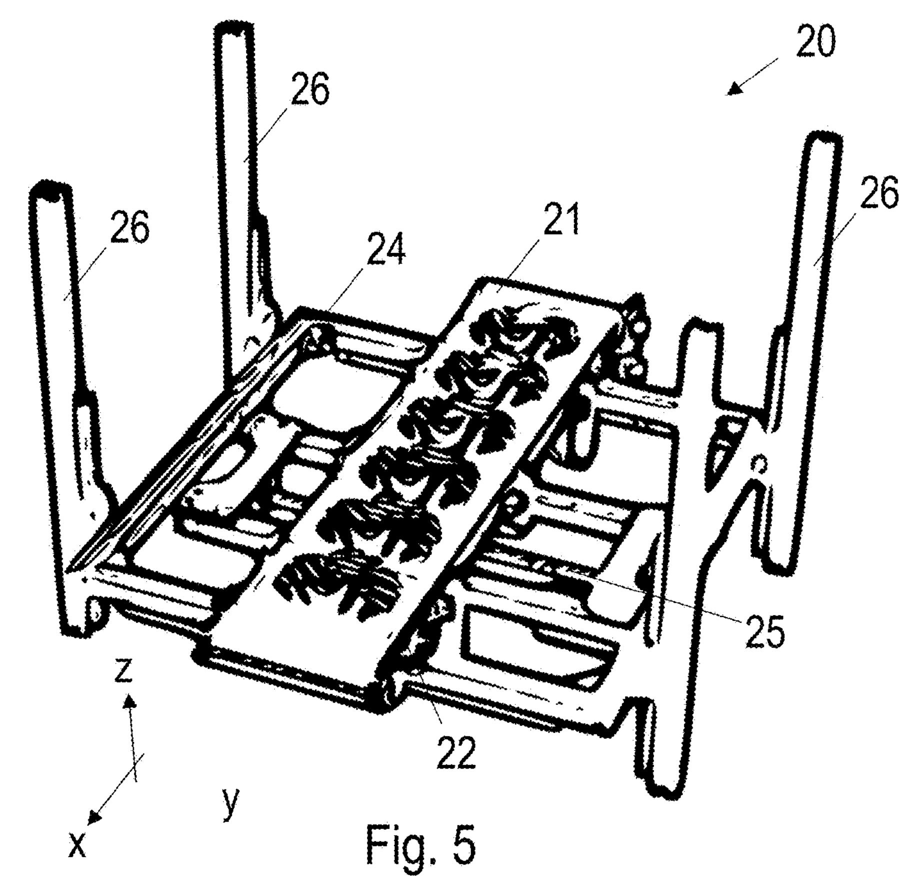
Fig. 5
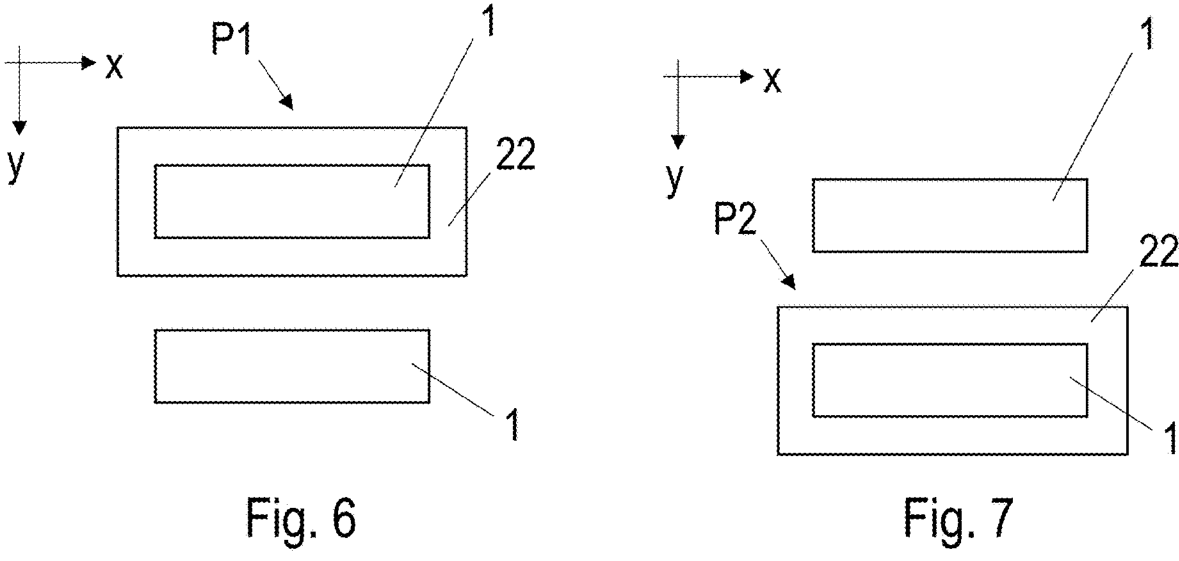
Fig. 6
Fig. 7

EXTRUDER DEVICE WITH AT LEAST TWO SCREWS AND A COMMON COMPARTMENT

FIELD OF THE INVENTION

The present invention relates to an extruder device for 3D printing a viscous material, in particular plant-based foodstuff material.

BACKGROUND

The development of environmentally friendly food alternatives to animal proteins is of considerable importance as climate change, overpopulation, massive meat production and overfishing destroy natural ecosystems. Additive manufacturing is not only a potential application for the hard tech industry like automotive, aerospace and robotics, but it is also a feasible alternative to produce plant-based seafood and meat, as it can easily recreate the texture and the mouthfeel of animal products.

Although meat alternatives like tofu, tempeh or seitan have been present for many years, new animal protein alternatives with similar sensory properties have been developed thanks to the extensive research that is present nowadays. Plant-based meat alternatives are becoming increasingly popular, which is reflected in the increasing sales of meat substitutes in recent years. Since 2010, average growth of more than 8% per year is forecast in Europe, and more than 20% from 2021 onwards. Nevertheless, there are not so many sustainable alternatives to produce seafood alternatives.

Furthermore, the amount of heavy metals, pesticides, microplastics, PCBs, antibiotics and other harmful substances in fish meat is constantly increasing. This leads to a health risk for consumers, especially when eating raw fish products like sushi or smoked salmon. The occurrence of parasites, bacteria, and viruses in fish, which is particularly important in uncooked food like in sushi is responsible for thousands of hospitalizations worldwide every year.

A classical way of producing foodstuff via additive manufacturing is by means of 3D printing via syringe/piston systems, for which a cartridge is used. These systems are however limited to small range of materials and designs, such as chocolate and dough. A mass production of foodstuff cannot be achieved with such systems.

Another possibility to produce meat alternatives via additive manufacturing is for example described in WO2023021148, which shows a device for 3D printing for printing foodstuff material. The device comprises an inlet, a screw and an outlet. It can be seen that products have to be 3D printed one at a time and as such it is also difficult to implement a mass production of foodstuff with this device.

It is evident that the systems for printing 3D foodstuff described above cannot be upscaled easily, and as such the production rates are limited to the production rates of the individual devices.

It is therefore an object of the present invention to provide an extruder device which allows mass production of 3D printed viscous material, in particular plant-based foodstuff material.

This object is solved by means of an extruder device for 3D printing a viscous material, in particular plant-based foodstuff material, wherein the extruder device comprises at least two compression screws, which are arranged within a common compartment, wherein the common compartment comprises a nozzle for each compression screw, a feeding section for feeding the viscous material to the at least two compression screws and a compression section located between the feeding section and the nozzles for compressing viscous material towards the nozzles.

The inventive extruder device has the advantage that it allows for a mass production of 3D printing a viscous material since the extruder device allows to print at least two products, e.g., artificial salmon fillets, at the same time. Moreover, the extruder device allows a continuous additive manufacturing process because the feeding section acts as a hopper for storing the viscous material. The extruder device therefore allows for continuous additive manufacturing of multiple 3D structures over a long period of time with little to no manual intervention.

The extruder device is therefore especially suited for a use in a manufacturing line where multiple structures can be produced in parallel. The device can furthermore be controlled in an efficient manner as only the compression screws need to be driven in order to start, pause or stop the 3D printing process of multiple products.

The device furthermore has the additional advantage that it can be easily disassembled for cleaning and maintenance because all compression screws are only enclosed by one single element, i.e., the common compartment, which at the same time embodies a voluminous storage container in the feeding section and a compression section for all compression screws. The swift removal of the single common compartment also has the advantage that all compression screws can quickly and simultaneously be made accessible. Thereby, screws can quickly be replaced by other types of compression screws, if needed, or simply be removed for cleaning.

In an especially preferred embodiment, the device comprises a screw barrel for each compression screw, wherein the screw barrels are located in the compression zone. The screw barrels usually have a cylindrical or conical inner shape and therefore allow for a tight enclosure of the compression screws. If the screw barrels can be removed from the common compartment and exchanged for screw barrels with different inner diameters, it is also possible to adjust the compression and adapt the extruder device to different use cases. When exchanging a screw, the screw barrel can be exchanged at the same time. However, the screw barrels could also be integrally formed in the common compartment. In other embodiments, no screw barrels are provided.

As mentioned before, the common compartment embodies a voluminous storage container in the feeding section. As such, the volume of the feeding section should be higher than in the compression section. To this end, it can be provided that the feeding section has a larger cross-sectional area than the compression section, preferably in all sections along the longitudinal direction of the screw, optionally with the exception on the junction of the feeding section and the compression section, where the cross-sectional area could be the same. If screw barrels are used, the cross-sectional area of the feeding section will be larger than the cross-sectional area of the compression section even at said junction.

In many preferred embodiments, the feeding section is configured as a tapered reservoir. This on the one hand helps to achieve a feeding section with a high volume but on the other hand also facilitates the flow of viscous material towards the compression section. A tapered reservoir also has the advantage that the top side of the tapered reservoir may be left open, such that there can be provided a relatively large opening for refilling viscous fluid into the common reservoir.

It is especially preferred if the feeding section is configured to hold at least 10 l, 20 l, 35 l or 50 l of viscous material. For example, if the extruder device is configured to print six salmon fillets in parallel, said specification of the feeding section allow to print 500 fillets a day with a minimum of refill operations.

Usually, it is provided such that all compression screws print the same structures in the same material. In this case, the feeding section may be configured such that viscous material filled into the feeding section is in fluid connection with all compression screws. This has the additional advantage that viscous material filled into the common compartment is evenly distributed to all compression screws such that it is very unlikely to occur that viscous material is provided to one compression screw but not to another.

However, it may also be possible that the compression screws print the same structures but in different material, in which case at least one partition wall may be located within the common compartment such that viscous material filled into the feeding section on one side of the partition wall is in fluid connection with only a subsection of the compression screws.

In general, the screws within the common compartment can be arranged in an arbitrary manner, for example in a linear manner along a straight or curved line or even in an m×n array, where m and n are at least 2 or at least 3. The amount of compression screws can in principle be chosen arbitrarily but may be limited by a power of the motor if the compression screws are driven by a common motor. In especially preferred embodiments, there are provided at least three compression screws, preferably exactly six compression screws, arranged in a linear manner.

In general, it is possible to provide a motor for each compression screw, such that each compression screw is driven by a different motor. However, it is preferred if all compression screws are driven by a common motor, which is linked to the compression screws via a linkage. This firstly has the advantage that less structural components have to be used but also ensures that all compression screws are driven uniformly with the same speed. Also the control of the device is simplified as there will be only one motor which has to be driven. In other embodiments, at least two of the screws could be driven by different motors, for example when individual compression screws or subsets of compression screws are to be driven independently or when the compression screws would provide too much resistance when driven by a common motor.

The extruder device described above may be used for a 3D printing system, in which case the 3D printing system usually comprises at least one first extruder device as described above and a conveyor. The extruder device is arranged such that all nozzles of the extruder device print the viscous material onto the conveyor. For example, if the extruder device comprises six compression screws, it will be possible to print six structures onto the same conveyor at the same time. Preferable, the extruder device is static and the conveyor is capable of moving in three orthogonal directions. In this case, the conveyor may be moved in such a way that the structures are printed in three dimensions. For example, the conveyor moves within a horizontal x, y plane while the extruder device prints several structures (according to the number of compression screws) to print a first layer of the structure, then the conveyor moves in the vertical z-direction such that a second layer of the structure may be printed onto the first layer, etc. However, it is also possible to move the extruder device along one, two or three orthogonal directions to achieve the same effect. In this case, the extruder device could print onto a normal, e.g., static, 3D printing platform. However, a static extruder device is preferred because the feeding section of the common compartment acts as a storage unit of the extruder device and depending on the fill level of the common compartment, the weight of the extruder device may vary significantly, which complicates driving the extruder device.

In a preferred embodiment for a conveyor in conjunction with an at least partially static extruder device, the conveyor has a conveyor support and a conveyor belt at least partially covering the conveyor support, wherein the conveyor belt is configured to move structures located thereon in a first horizontal direction and the conveyor support is preferable also configured to be moved in a second horizontal direction normal to the first horizontal direction, in particular via a spindle drive, and especially preferably also in a vertical direction. The conveyor belt has the advantage that the structures can be advances in a first direction while printing, but also to move structures off the conveyor after they have been fully printed. In other embodiments, however, it is possible to provide a conveyor without a conveyor belt, for example when the conveyor comprises a beltless but movable 3D printing platform.

If there is exactly one extruder device provided for one conveyor, it is possible to print structures of a uniform material onto the conveyor, which may be employed for printing pasta, for example.

However, in other examples the 3D printing system may further comprise a second extruder device, wherein the second extruder device is arranged such that all nozzles of the extruder device also print the viscous material onto the conveyor. The conveyor may then be controlled such that a partial structure printed by the first extruder device is moved underneath the second extruder device, which prints at least another layer onto the partial structure. Thereby, complex structures with many layers of different materials may be printed, for example salmon fillets having protein layers and fat layers. It is also possible that three or more extruder devices may print onto the same conveyor to print even more complex structures.

In the above-mentioned embodiment, the conveyor may have a limited size such that the conveyor is only located under the first extruder (and not under the second extruder) when the first extruder device prints and is only located under the second extruder (and not under the first extruder) when the second extruder device prints. This embodiment is suited for printing layers of different materials with a lightweight conveyor. In other embodiments it is possible that the conveyor has such a size that the two extruder devices could print onto the conveyor at the same time, for example even with the same material, which could be used for an efficient upscaling.

The above-mentioned extruder devices and systems comprising at least one extruder device and a conveyor are especially suited for upscaling. This allows to construct an entire manufacturing line comprising at least two 3D printing systems as mentioned above and a main conveyor, wherein the two at least two 3D printing systems are configured to unload printed viscous materials onto the main conveyor, and the conveyors and the main conveyors are preferable operated such that when unloading structures from the conveyors onto the main conveyor, the unloaded structures do not collide with structures already placed on the main conveyor. Of course, it is possible to connect even more than two 3D printing systems to the main conveyor, for example at least four, at least eight, or at least sixteen.

The manufacturing line may also be further automatized by providing at least one reservoir for storing the viscous fluid and a pipe system connecting the at least one reservoir with at least two common compartments. The reservoir allows an automatized or at least semi-automatized refilling of the common compartments of the extruder devices in the manufacturing line. The pipe system may contain valves for selectively refilling common compartments. Furthermore, there may be a control unit connected to at least two or preferably extruder devices of the manufacturing line, especially to one or more motors driving the compression screws, and preferably also at least one of the following components: at least one or all conveyors, the main conveyor, at least one valve of the pipe system.

BRIEF DESCRIPTION OF THE DRAWINGS

In the following, preferred and alternative embodiments of the invention will be described with reference to the figures.

FIG. 5 shows further components of the conveyor of FIG. 4 for a movement in two additional axes.

FIGS. 6 and 7 show variants of the invention, where viscous material is printed from two static extruder devices onto a single conveyor, which is moved from a first position (FIG. 6) to a second position (FIG. 7).

DETAILED DESCRIPTION OF THE PREFERRED EMBODIMENTS

Figure 1:
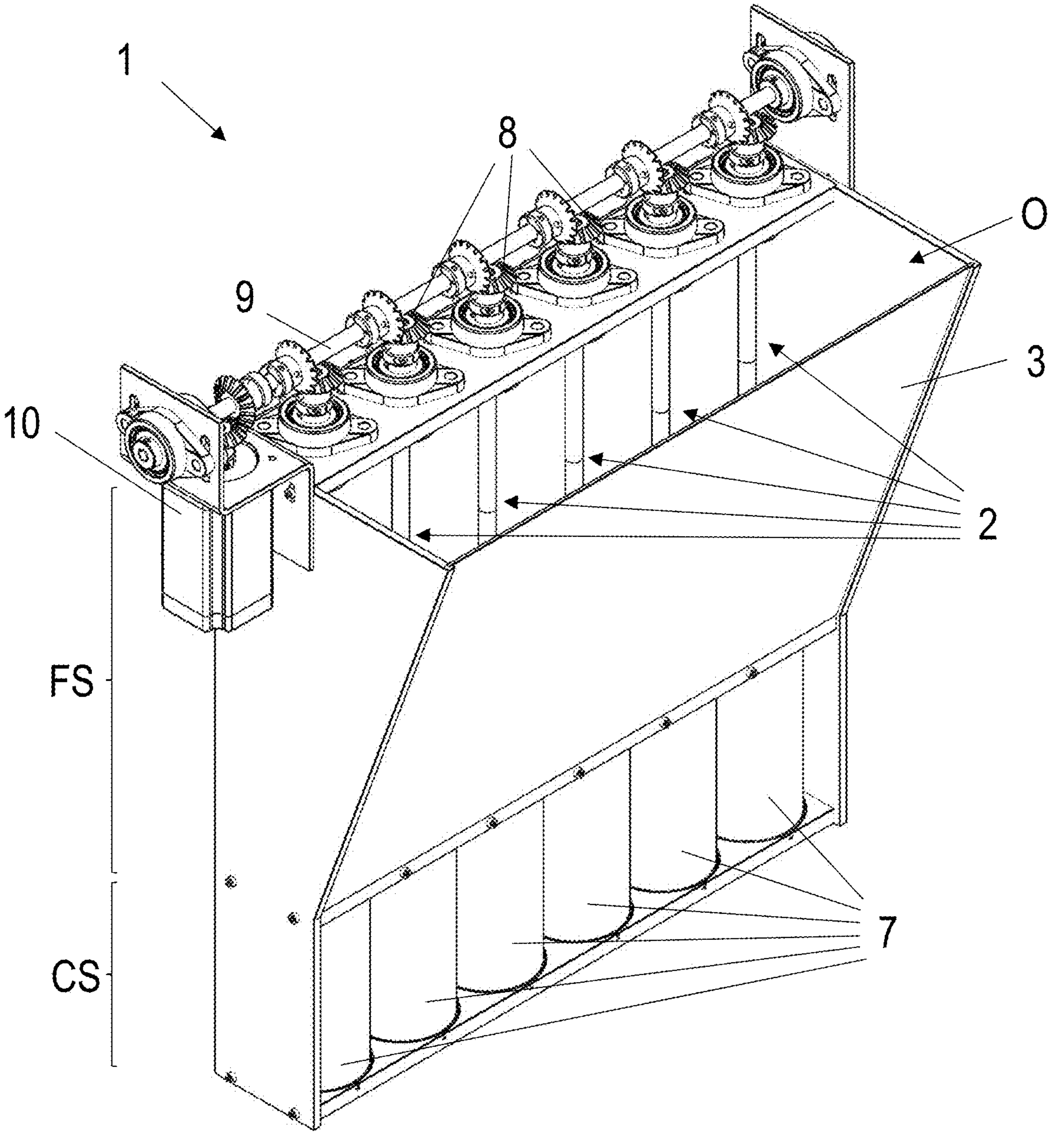
FIG. 1 shows an extruder device according to one embodiment of the invention in a perspective view.

FIG. 1 shows an extruder device 1 for 3D printing a viscous material, in particular plant-based foodstuff material. The viscous material could, for example, have a viscosity of 3000 Pas to 18000 Pas. In most embodiments, the viscous material is foodstuff material such as for the production of meat/seafood alternatives, pasta, dysphagia applications, doughs or personalized food. On the other hand, however, the viscous material could also be clay or concrete. As such, the extruder device 1 is not limited to specific use cases.

Figures 2, 3:
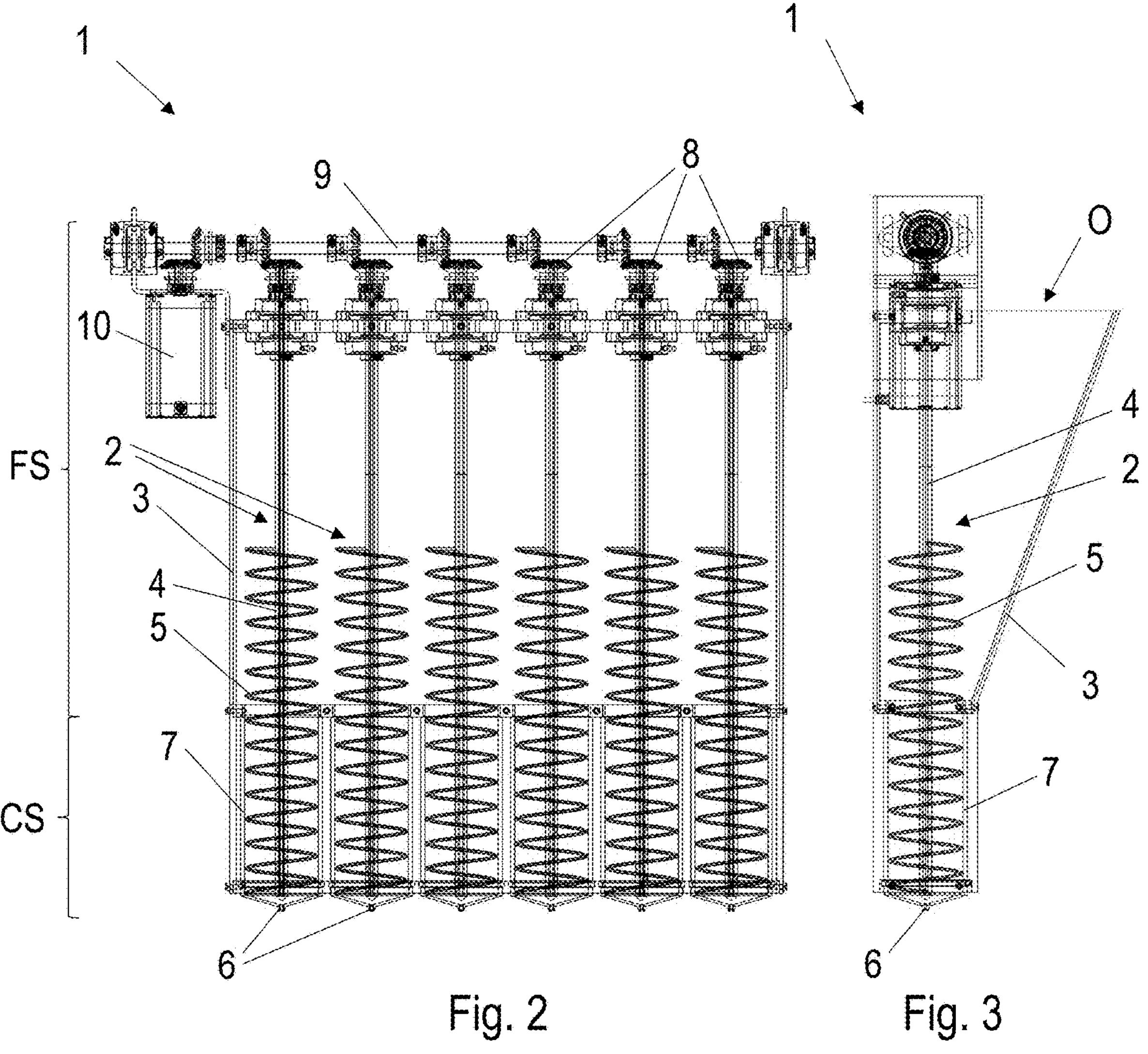
FIGS. 2 and 3 show the extruder device of FIG. 1 in a first side view (FIG. 2) and a second side view (FIG. 3).

As can be seen in FIGS. 1, 2 and 3, the extruder device 1 comprises six compression screws 2, which are located within a common compartment 3. In general, the invention is not restricted to six compression screws 2 but there could be two or more compression screws 2 located inside the common compartment 3. The compression screws 2 are usually arranged in a linear manner along a straight line (as shown in FIGS. 1 to 3), but other configurations are possible too. For example, the compression screws 2 could be arranged in an array with at least two compression screws 2 per line of the array and at least two compression screws 2 per row of the array, or linearly along a curved line, instead of a straight line as shown.

As can be seen especially from FIG. 2, the compression screws 2 may each comprise a screw shaft 4 and a screw winding 5. The screw winding 5 can generally be of an arbitrary shape and chosen depending on the viscous material and the desired texture of the foodstuff to be printed. The screw winding 5 can be continuous or interrupted, single flight or multi flight, and also have a varying shape over its length. The screw winding 5 usually has a cylindrical outer shape upon rotation but could also have a conical outer shape upon rotation. The screw winding 5 could be integrally formed on the screw shaft 4 or detachably mounted thereon. The compression screws 2 each define an axis of rotation (rotational axis), which runs through the screw shaft 4 and screw winding 5, respectively. The rotational axes of all compression screws 2 of the extruder device 1 are usually in parallel. In some embodiments it is also possible to use compression screws 2 without a dedicated screw shaft 4.

As can be further seen from FIGS. 2 and 3, the common compartment 3 comprises a nozzle 6 for each compression screw 2. The nozzles 6 each allow a passing of viscous material from the inside of the common compartment 3 to the outside pf the common compartment 3 and define the shape of the extrudate which is being printed. All nozzles 6 can each be configured in the same way or differently to provide different textures of the printed foodstuff material for each nozzle 6, for example.

The common compartment 3 is composed of two different sections, namely a feeding section FS and a compression section CS. The feeding section FS is the zone where the viscous material is fed into the extruder device 1 and stored. The compression section CS is the zone where the viscous material is being compressed into a closed area to build up the pressure needed for printing when rotating the compression screws 2.

The feeding section FS comprises at least one opening O for feeding viscous material into the common compartment 3. As is shown in FIG. 1, the opening O could simply be embodied by designing the common compartment 3 without a cover. Alternatively, the opening O could also be embodied by a through hole through a side wall or a cover of the common compartment 3.

The nozzles 6 are arranged such that they are located on one side of the compression section CS, e.g., a bottom of the common compartment 3. The compression section CS is in turn located between the feeding section FS and the nozzles 6. Such a setup allows to introduce the viscous matter through the opening into the common compartment 3, more precisely into the feeding section FS. By rotating the compression screws 2, the viscous matter is transported from the feeding section FS to the compression section CS and from there through the nozzles 6 onto a substrate such as a conveyor (see below).

To compress the viscous material and to eject it from the nozzles 6, the screw winding 5 is at least partially located inside the compression section CS. Usually, the screw winding 5 extends through the whole compression section CS, i.e., from the nozzle 6 to at least the junction between the compression section CS and the feeding section FS. As can be seen in FIGS. 2 and 3, the screw winding 5 can also extend at least partially through the feeding section FS, which may improve the transport of viscous material from the feeding section FS to the compression section CS.

Referring again to FIG. 1, it can be seen that for each compression screw 2, a screw barrel 7 may be located in the compression section CS. The screw barrels 7 are arranged in such a way that one compression screw 2 is located inside each screw barrel 7. The inner diameter of the screw barrel 7 may substantially be the same as the outer diameter of the screw 2 or may be slightly larger than the outer diameter of the compression screw 2 to allow for a clearance or to allow for a predefined compression rate, considering that the compression may be reduced if there is more clearance. In some examples, the inner diameter of the screw barrel 7 may be up to 1%, up to 5% or up to 10% larger than the outer diameter of the screw 2. Other relationships of the diameters are possible too, depending on the viscous material, for example.

As mentioned above, the compression screws 2 usually have a cylindrical outer shape upon rotation, in which case also the screw barrels 7 usually have a cylindrical inner shape. If the compression screws 2 have a conical outer shape upon rotation, the screw barrels 7 usually have a conical inner shape.

The screw barrels 7 may be individual elements, which are inserted into the common compartment 3, as is shown in FIG. 1. In this way, the screw barrels 7 may be manufactured from a different material than the common compartment 3. In other embodiments, the screw barrels 7 might also be integrally formed with the common compartment 3. In the shown embodiment, the volume in the feeding section FS is common to all compression screws 2 while the screw barrels 7 provide for separated volumes for each compression screw 2. In other embodiments, the screw barrels 7 may also be omitted or connected in such a way that the volume in the compression section CS is common to all compression screws 2.

If the feeding section FS is common to all compression screws 2, viscous material filled into the feeding section FS is in fluid connection with all compression screws 2. In this case, the extruder device 1 will print multiple structures of the same material. In further embodiments (not shown), there may also be a at least one partition wall in the feeding section FS such that viscous material filled into the feeding section FS on one side of the partition wall is in fluid connection with only a subsection of the compression screws 2. Thereby, a first viscous material may be provided to one or more compression screws 2 on one side of the partition wall and a second viscous material may be provided to one or more compression screws 2 on the other side of the partition wall. In this way, multiple structures of the same shape but in different materials can be manufactured at the same time.

The feeding section FS and the compression section CS may also differ from one another in the cross-sectional area. The term "cross-sectional area" here refers to a cross section in a plane normal to the longitudinal direction (rotational axis) of the compression screw 2. As the feeding section FS is intended as a common storage volume for all compression screws 2, the feeding section FS should have a relatively high storage volume when compared to the volume within the compression section CS, which should be relatively small for achieving the compression effect. As such, in preferred embodiments a cross-sectional area of the feeding section FS, on at least one point or on all points along the longitudinal direction of the compression screw 2, should be higher than the cross-sectional area of the compression section FS along any point of the longitudinal direction of the compression screw 2. The feeding section FS can comprise at least 10 l, 20 l, 35 l, or 50 l (liters) of viscous material. The volume of the feeding section FS may be adjusted depending on the structure to be produced.

Usually, the cross-sectional area of the compression section CS is substantially uniform along the longitudinal direction of the compression screw 2. In the example of FIG. 1, the cross-sectional area of the compression section CS would be defined by the inner diameter of the screw barrels 7 and the amount of screw barrels 7.

On the other hand, the cross-sectional area of the feeding section FS is usually varying along the longitudinal direction of the compression screws 2 as is shown in FIGS. 1 and 3. Here, the feeding section FS has the shape of a tapered reservoir, specifically the shape of a cropped triangular prism. In other words, three of the side surfaces are substantially vertical and one side surface is slanted with respect to a vertical plane. The bottom side of the feeding section FS connects to the compression section CS and the top side of the feeding section FS is coverless and embodies the opening O. The compression screws 2 extend through the opening O towards a linkage 9 or motor 10 (see below). Other variants of tapered reservoirs are possible too, for example when two of the side surfaces opposite to each other or all four side surfaces are slanted with respect to a vertical plane. Non-tapered reservoirs are possible too, for example when the feeding section FS has a cubic shape. Here, (e.g., horizontal) connection plates could be provided between the side walls of the compression section CS and the side walls of the feeding section FS to allow for an enlarged cross-sectional area of the feeding section FS with respect to the compression section CS.

To drive the compression screws 2, each compression screw 2 may be provided with a gear 8 on the screw shaft 4 on the side of the compression screw 2 located opposite of the nozzle 6. In this way, the compression screws 2 can be coupled via the gear 8 to a linkage 9 having complementary gear elements. Upon rotating the linkage 9 via a motor 10, the linkage 9 transmits the rotational movement via the gear 8 to the compression screw 2 such that the viscous material can be compressed in the compression section CS and ejected via the nozzle 6. The motor 10 may be an electric stepper motor which allows precise and controlled motion via a control software of the extruder device 1 to provide the extrusion needed for printing. The transmission (comprising linkage 9 and gears 8) may comprise a bevel gear system with a 1:1 ratio, which means that for one rotation of the motor the compression screws 2 are making one rotation as well. However, a different ratio may be chosen depending on the use.

As each compression screw 2 may be equipped with a gear 8 and linked to the linkage 9, the motor 10 may be configured to drive all compression screws 2 at the same time, i.e., the linkage 9 transmits the rotational movement via the gears 8 to all compression screws 2 at the same time. The motor 10 thus drives all compression screws 2 at the same time and the compression screws 2 may not be rotated individually. In other embodiments, however, each compression screw 2 could be provided with its own motor 10, which could couple to the gear 8, for example. In this embodiment, no linkage 9 would be necessary. It is to be understood that other embodiments for driving the compression screws 2 are possible too, for example by omitting or replacing the gears 8, linkage 9 and/or motor 10 with similar structures.

Figure 4:
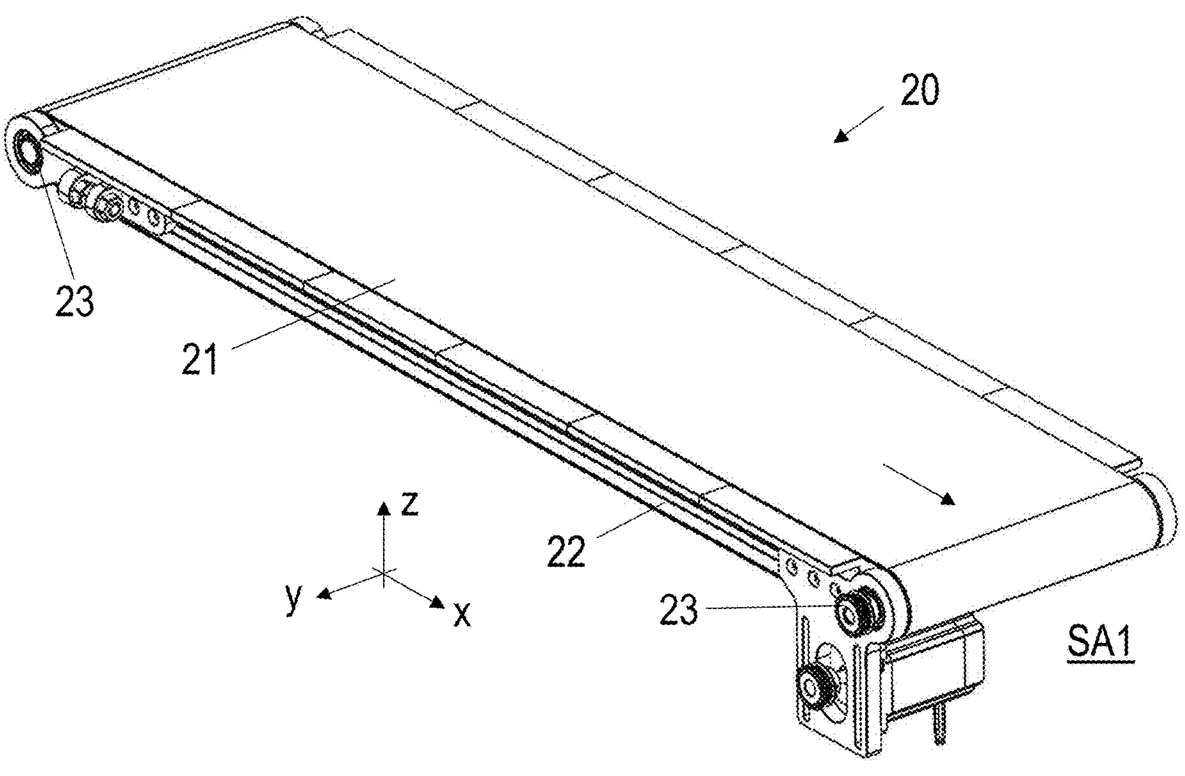
FIG. 4 shows a conveyor for use in conjunction with the extruder device of FIG. 1.

To print a 3D structure with the extruder device 1 disclosed above, the extruder device 1 may be used in conjunction with a conveyor 20 as shown in FIG. 4. The conveyor 20 has such a size that all nozzle 6 can print onto the conveyor 20 at the same time. The extruder device 1 is usually statically arranged and the conveyor 20 may move along three preferably orthogonal directions x, y, z such that three-dimensional structures can be printed via the static nozzles 6. The x-axis and the y-axis usually lie in a horizontal plane, while the z-axis may be a vertical direction.

The conveyor 20 may comprise a conveyor belt 21, which is located on a conveyor support 22 and moved by means of two rollers 23 to transport printed structures in the x-direction. The rollers 23 may be driven by an electric stepper motor controlled precisely with the printer software, providing the rotation speed and torque needed to run the belt smoothly and accurately. Furthermore, a tensioner can be provided, which is designed to tension the conveyor belt 21 to avoid any sliding of the conveyor belt 21 from the roller 23. The more tension is added, the more friction between the roller 23 and the conveyor belt 21 is occurring, allowing a good transmission from the roller 23 to the conveyor belt 21.

The conveyor belt 21 may be provided for two purposes. Firstly, to advance a structure during printing in the x-direction, i.e., while viscous material is ejected through the nozzle 6, the conveyor belt 21 may be moved in the x-direction to print a structure that is elongated in the x-direction. Secondly, the conveyor belt 21 may move the structures off the conveyor 20 after they are fully printed onto a first support area SA1 (which may also be a further conveyor, see FIG. 8). Thereafter, the conveyor belt 21 will be empty and the extruder device 1 may start printing new structures.

For printing the structures along the y-axis and z-axis, a setup as shown in FIG. 5 may be utilized. FIG. 5 shows the conveyor belt 21 on the conveyor support 22 as shown in FIG. 4. Furthermore, this conveyor 20 comprises a frame 24, on which the conveyor support 22 is mounted movably in the y-direction. To this end, one or more spindles 25 may be provided, which run in the y-direction and engage with a bearing of the conveyor support 22 such that upon a rotation of the spindle 25, the conveyor support 22 and thus also the structures on the conveyor support 22 (or the conveyor belt 21, respectively), move in the y-direction.

To move the conveyor support 22 and the structures thereon in the z-direction, the whole frame 24 may be moved in the z-direction along stationary support struts 26. A corresponding drive can be implemented in numerous ways, e.g., also as a spindle drive.

The conveyor 20 described above can however also be configured in different ways, e.g., without the conveyor belt 21 if the conveyor support 22 is movable in the x-direction by other means. Also, if the extruder device 1 is movable in one or more directions, it is not necessary to move the conveyor 20 in the corresponding direction. For example, if the extruder device 1 is movable in the y-direction and z-direction, the conveyor support 22 of FIG. 4 may be arranged statically such that the conveyor 20 only facilitates a movement of printed structures in the x-direction via the conveyor belt 21. It is also possible to provide no movement in one of the directions x, y and/or z at all, for example if linear structures or one-layer structures are to be manufactured.

With the means described above, it is also possible to efficiently manufacture structures with different materials. For example, artificial salmon fillets are to be manufactured with an orange protein layer and a white fat layer. To this end, two of the extrusion devices 1 may be arranged next to each other, as is shown in FIGS. 6 and 7. If the compression screws 2 of the extrusion devices 1 are arranged in a linear manner, the lines of compression screws 2 are preferably arranged in parallel to each other.

Such an arrangement can in particular be combined with a conveyor 20 as described above. The extrusion devices 1 or lines of compression screws 2 are then arranged with an offset in the y-direction and there is no offset in the x-direction and z-direction, for example. The offset in the y-direction is such that conveyor support 22 may move from a first position P1 under the first extrusion device 1 (FIG. 6) to a second position P2 under the second extrusion device 1 (FIG. 7). Alternatively or additionally, an offset in the x-direction could be possible too. If the extrusion devices 1 are filled with different viscous materials, of example orange protein in one extrusion device 1 and white fat in the other extrusion device 1, differently layered structures can be manufactured. Of course, the conveyor support 22 may move between positions P1 and P2 back and forth to allow for a printing of complex structures. It is also possible to arrange more than two extrusion devices 1 in a manner as shown above to print structures with three or more materials. However, in other embodiments the extrusion devices 1 could also print onto the conveyor 20 at the same time, for example if the conveyor is larger in the y-direction as shown in FIGS. 6 and 7. Here, the extrusion devices 1 could also be filled with the same viscous material.

Figure 8:
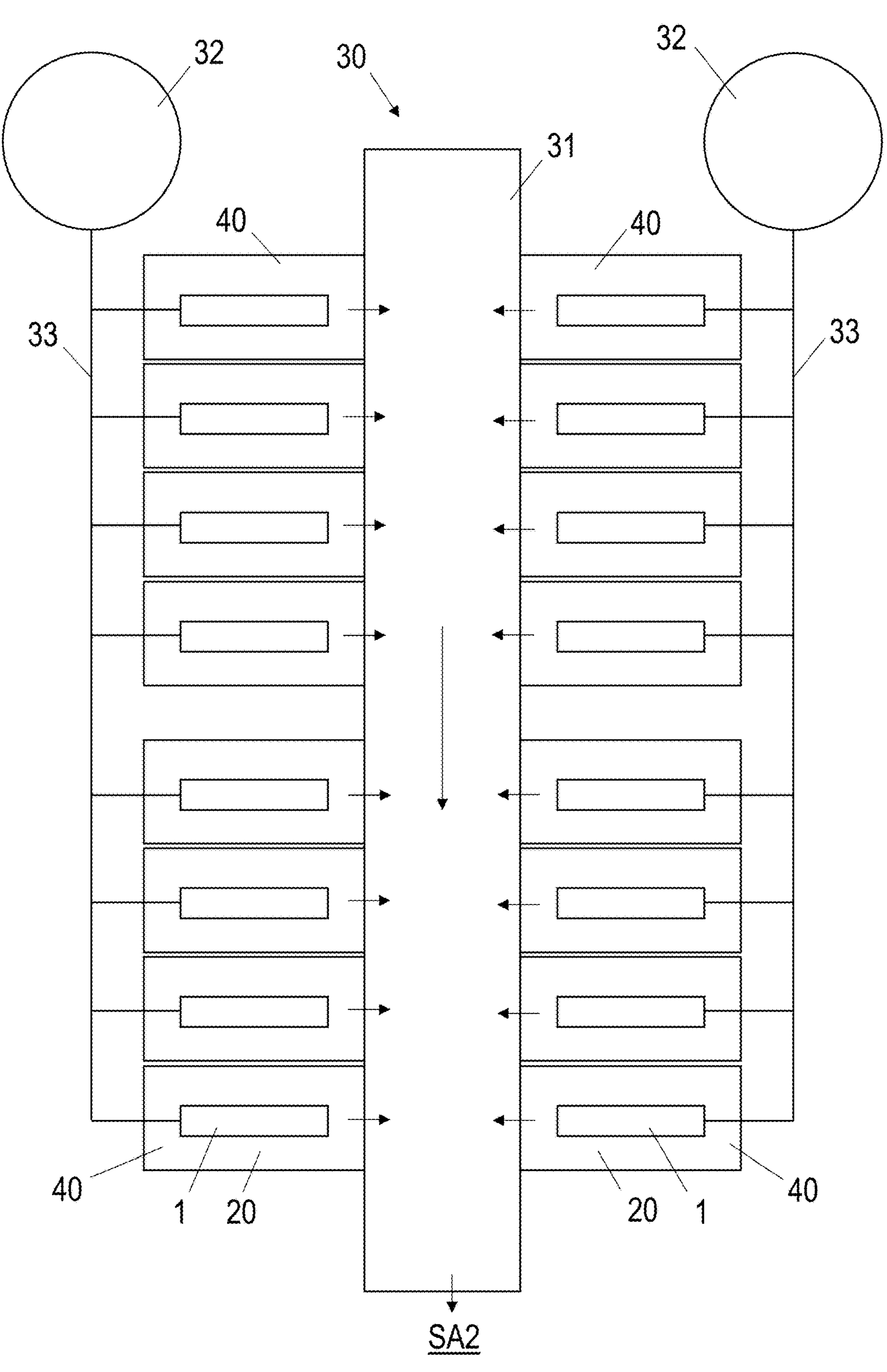
FIG. 8 shows a manufacturing line with inventive extruder devices and conveyors.

Turning to FIG. 8, it can be seen that a manufacturing line 30 can be formed by combining a plurality of systems 40, each comprising an least one extrusion device 1 and a conveyor 20. The conveyors 20 of the systems 40 each unload printed structures onto a main conveyor 31, which therefore corresponds to the first support area SA1 of FIG. 4. The main conveyor 31 can also comprise a conveyor belt (not shown in detail) to transport structures onto a second support area SA2. Systems 40 comprising an extrusion device 1 and a conveyor 20 can be arranged on both sides of the main conveyor 31, as is shown, or alternatively only on one side of the main conveyor 31.

Usually, the conveyors 20 and the main conveyor 31 are operated such that when unloading products from the conveyors 20 onto the main conveyor 31, the unloaded structures do not collide with structures already placed on the main conveyor 31. To this end, the drives of all conveyors 20 and the drive of the main conveyor 31 can be connected to a single control unit. This control unit, or a different control unit, may also control be connected to all motors 10 of the systems 40 and also control movement in y-directions and z-directions for printing the structures.

Furthermore, FIG. 8 shows that two reservoirs 32 for storing the viscous fluid can be used to provide viscous material to the extruder devices 1. In this embodiment, the reservoirs 32 contain the same viscous material. In general, however, also one or more than two reservoirs 32 could be employed to deliver viscous material to the extruder devices 1.

To deliver the viscous material from the reservoir/s 32 to the extruder devices, a pipe system 33 can be utilized, which connects the reservoir 32 to one or more extruder devices 1, e.g., by having a pipe of the pipe system 33 connected to or extending into the opening O.

If different viscous materials are to be used, either if a partition wall is present in the common compartment 3 or if multi-layered structures are to be produced as was described in reference to FIGS. 6 and 7, there could be two reservoirs 32, each storing a different viscous material and connected with pipe systems 33 to the specific common compartments 3. At this stage it should also be mentioned that while FIG. 8 shows a manufacturing line 30 with systems 40 having a conveyor 20 and a single extruder device 1, this manufacturing line 30 could also be used with systems as shown in FIGS. 6 and 7, where two extruder devices 1 print onto the same conveyor 20.

What is claimed is:

1. An extruder device for 3D printing a viscous material, wherein the extruder device comprises:

two compression screws, which are arranged within a common compartment, wherein the common compartment comprises a nozzle for each compression screw, a feeding section (FS) for feeding the viscous material to the at least two compression screws, and a compression section (CS), located between the feeding section (FS) and the nozzles, that is configured to compress the viscous material, and wherein screw windings of the compression screws extend at least partially into the feeding section (FS), and wherein the feeding section (FS) is common to all compression screws.

2. The extruder device according to claim 1, further comprising a screw barrel for each compression screw, wherein the screw barrels are located in the compression section (CS).

3. The extruder device according to claim 1, wherein the feeding section (FS) has a larger cross-sectional area than the compression section (CS).

4. The extruder device according to claim 1, wherein the feeding section (FS) is configured as a tapered reservoir.

5. The extruder device according to claim 1, wherein the feeding section (FS) is configured to hold at least 10 l, 20 l, 35 l or 50 l of viscous material.

6. The extruder device according to claim 1, wherein the feeding section (FS) is configured such that viscous material filled into the feeding section (FS) is in fluid connection with all compression screws.

7. The extruder device according to claim 1, wherein at least one partition wall is located within the common compartment such that viscous material filled into the feeding section (FS) on one side of the partition wall is in fluid connection with only a subsection of the compression screws.

8. The extruder device according to claim 1, comprising at least three compression screws arranged in a linear manner.

9. The extruder device according to claim 1, wherein all of the compression screws are driven by a common motor, which is linked to the compression screws via a linkage.

10. A 3D printing system comprising a first extruder device according to claim 1, and a conveyor, wherein the extruder device is arranged such that all nozzles of the extruder device print the viscous material onto the conveyor.

11. The 3D printing system according to claim 10, further comprising a second extruder device that comprises:

two compression screws, which are arranged within a common compartment of the second extruder device, and wherein the common compartment of the second extruder device comprises a nozzle for each of the two compression screws of the second extruder device, a feeding section (FS) for feeding the viscous material to the two compression screws of the second extruder device and a compression section (CS) located between the feeding section (FS) of the second extruder device and the nozzles of the second extruder device, for compressing viscous material, and wherein the second extruder device is arranged such that all the nozzles of the second extruder device also print the viscous material onto the conveyor.

12. The 3D printing system according to claim 11, wherein the conveyor is configured to move material printed by the first extruder device directly under the second extruder device.

13. The 3D printing system according to claim 10, wherein the conveyor has a conveyor support and a conveyor belt at least partially covering the conveyor support, wherein the conveyor belt is configured to move structures located thereon in a first horizontal direction (x) and the conveyor support is configured to be moved in a second horizontal direction (y) normal to the first horizontal direction (x).

14. A manufacturing line comprising at least two 3D printing systems according to claim 8 and a main conveyor, wherein the at least two 3D printing systems are configured to unload printed viscous materials onto the main conveyor.

15. The manufacturing line according to claim 14, comprising at least one reservoir for storing the viscous material and a pipe system connecting the reservoir with at least two common compartments.

* * * * *